United States Patent
Tago et al.

(10) Patent No.: US 7,471,358 B2
(45) Date of Patent: Dec. 30, 2008

(54) LIQUID CRYSTAL DISPLAY DEVICE

(75) Inventors: Keiji Tago, Fukaya (JP); Hiroshi Tabatake, Fukaya (JP); Hiroyuki Kimura, Fukaya (JP); Tetsuya Iizuka, Saitama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 91 days.

(21) Appl. No.: 11/555,880

(22) Filed: Nov. 2, 2006

(65) Prior Publication Data

US 2007/0121039 A1    May 31, 2007

(30) Foreign Application Priority Data

Nov. 22, 2005    (JP)    ............................. 2005-337722

(51) Int. Cl.
    *G02F 1/1335*    (2006.01)
(52) U.S. Cl. .................... 349/114; 349/106; 349/108; 349/113
(58) Field of Classification Search ......... 349/113–114, 349/106–109
    See application file for complete search history.

(56) References Cited

U.S. PATENT DOCUMENTS

| | | | |
|---|---|---|---|
| 6,714,270 B2 | 3/2004 | Seiki et al. | |
| 6,909,479 B2 | 6/2005 | Iijima | |
| 7,053,974 B2 * | 5/2006 | Hwang | 349/106 |
| 7,206,042 B2 * | 4/2007 | Yang et al. | 349/106 |
| 7,317,500 B2 * | 1/2008 | Morimoto et al. | 349/114 |
| 2005/0083453 A1 | 4/2005 | Nakano et al. | |
| 2005/0280757 A1 | 12/2005 | Yamada et al. | |
| 2006/0017866 A1 * | 1/2006 | Morimoto et al. | 349/106 |
| 2007/0121039 A1 | 5/2007 | Tago et al. | |

FOREIGN PATENT DOCUMENTS

JP    2002-303863    10/2002

OTHER PUBLICATIONS

U.S. Appl. No. 11/938,531, filed Nov. 12, 2007, Tago.

* cited by examiner

*Primary Examiner*—Jacob Y. Choi
*Assistant Examiner*—Keith Jankowski
(74) *Attorney, Agent, or Firm*—Oblon, Spivak, McClelland, Maier & Neustadt, P.C.

(57) ABSTRACT

In order to make a boundary inconspicuous, which is located between an image area which displays an image by translucent pixels and a dummy area which always displays a white color by reflection pixels, a size ratio of transparent areas in color filters of the reflection pixels with respect to reflection areas therein is made larger than a size ratio of transparent areas in color filters of the translucent pixels with respect to reflection areas therein. In such a way, brightness of the display is balanced by adjusting quantities of transmission light through the transparent areas of the reflection pixels with respect to quantities of reflection light generated unexpectedly on transmission areas of the translucent pixels. Then, degrees of whiteness in the translucent pixels and the reflection pixels are approximated to each other.

2 Claims, 4 Drawing Sheets

LIQUID CRYSTAL DISPLAY DEVICE

CROSS-REFERENCE TO RELATED APPLICATIONS

This application is based upon and claims the benefit of priority from Japanese Patent Application No. 2005-337722 filed on Nov. 22, 2005; the entire contents of which are incorporated herein by reference.

BACKGROUND OF THE INVENTION

1. Field of the Invention

The present invention relates to a translucent liquid crystal display device which displays an image by both of a light reflection mode and a light transmission mode.

2. Description of the Related Art

In general, in the field of a mobile information terminal such as a cellular phone and a mobile music player, a liquid crystal display device is used for displaying an image and a character. In particular, a translucent liquid crystal display device that displays an image by a light reflection mode and a light transmission mode has high visibility both indoors and outdoors. As the translucent liquid crystal display device, for example, the one disclosed in Japanese Patent Laid-Open Publication No. 2002-303863 is known.

In a conventional liquid crystal display device, as shown in FIG. 1, a frame-like black mask 3 has been provided on a periphery of an image area 1, and an area between the image area 1 and a cabinet of the mobile information terminal has been black.

In recent years, as a color of the cabinet of the mobile information terminal has been being diversified, it has been required that the area between the image area 1 and the mobile information terminal be displayed white to enhance an appearance thereof.

In usual, on the peripheral area between the image area 1 and the black mask 3, a dummy area that always performs white display is provided. In the image area, translucent pixels that have reflection areas and transmission areas are arrayed, where a color image is displayed by the light reflection mode and the light transmission mode. In the dummy area, reflection pixels that have only reflection areas are arrayed, where the white color is displayed by the light reflection mode.

However, structures in the pixels are different between the translucent pixels of the image area and the reflection pixels of the dummy area. In particular, while external light is reflected only on the reflection areas in the reflection pixels, the external light is reflected not only on the reflection areas but also on the transmission areas actually to some extent in the translucent pixels. Therefore, differences occur in reflectance and color tone between the image area and the dummy area, causing a problem that, in the case of performing the reflection display of the white color, a boundary therebetween becomes conspicuous.

SUMMARY OF THE INVENTION

It is an object of the present invention to improve the differences in reflectance ratio and color tone between the image area that performs translucent display and the dummy area owing to the structural difference between the pixels thereof, and to make the boundary between the image area and the dummy area inconspicuous in the case of performing the reflection display of the white color.

A first feature of the invention is in that a liquid crystal display device includes: an image area in which a plurality of translucent pixels having reflection areas and transmission areas are arrayed; a reflection display area in which a plurality of reflection pixels having only reflection areas are arrayed, the reflection area being disposed on a periphery of the image area; and color filters in which transparent areas are provided for each color in the respective reflection areas of the translucent pixels and the reflection pixels, wherein, with regard to color filters of at least the same one color, a size ratio of the transparent areas in the reflection pixels with respect to the reflection areas therein is larger than a size ratio of the transparent areas in the translucent pixels with respect to the reflection areas therein.

In this invention, in the color filters of at least the same one color, the size ratio of the transparent areas in the reflection pixels with respect to the reflection areas therein is larger than a size ratio of the transparent areas in the translucent pixels with respect to the reflection areas therein. In such a way, brightness of the display is balanced by adjusting quantities of transmission light through the transparent areas in the reflection pixels with respect to quantities of reflection light generated unexpectedly on the transmission areas in the translucent pixels. Moreover, since degrees of whiteness in the translucent pixels and the reflection pixels are approximated to each other, differences in reflectance ratio and color tone between the image area and the dummy area can be improved, and a boundary between both thereof can be made inconspicuous.

A second feature of the invention is in that a size of the reflection areas of the reflection pixels is equal to a size of the reflection areas of the translucent pixels, and a size of the transparent areas provided in the color filters of the reflection pixels is larger than a size of the transparent areas provided in the color filters of the translucent pixels.

In this invention, the size of the reflection areas of the reflection pixels is equalized to the size of the reflection areas of the translucent pixels, thus making it possible to easily adjust the size ratios only by the sizes of the transparent areas of the reflection pixels and the translucent pixels.

A third feature of the invention is in that the color filters have the three colors being red, green, and blue, a size of the reflection areas of the reflection pixels is larger than a size of the reflection areas of the translucent pixels, in the blue color filter, the size ratio of the transparent areas provided in the reflection pixels with respect to the reflection areas provided therein is larger than the size ratio of the transparent areas provided in the translucent pixels with respect to the reflection areas provided therein, and in each of the red and green color filters, the size ratio of the transparent areas provided in the reflection pixels with respect to the reflection areas provided therein is smaller than the size ratio of the transparent areas provided in the translucent pixels with respect to the reflection areas provided therein.

In this invention, the size of the reflection areas of the reflection pixels is larger than the size of the reflection areas of the translucent pixels, and in the blue color filter, the size ratio of the transparent areas provided in the reflection pixels with respect to the reflection areas provided therein is larger than the size ratio of the transparent areas provided in the translucent pixels with respect to the reflection areas provided therein. In such a way, the brightness is ensured by transmission light though the transparent areas of the reflection pixels. Moreover, in each of the red and green color filters, the size ratio of the transparent areas provided in the reflection pixels with respect to the reflection areas provided therein is smaller than the size ratio of the transparent areas provided in the translucent pixels with respect to the reflection areas provided therein. In such a way, degrees of whiteness of both of the reflection pixels and the translucent pixels are adjusted, thus making it possible to improve differences in reflectance and color tone between the reflection areas and the translucent display areas.

DESCRIPTION OF THE EMBODIMENT

First Embodiment

Figure 1:
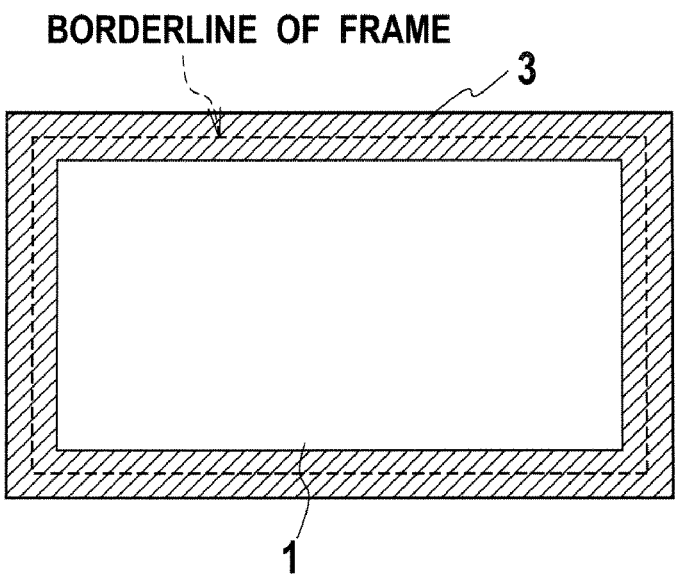
FIG. 1 is a plan view showing a schematic structure of a periphery of an image area in a conventional liquid crystal display device.
Figure 2:
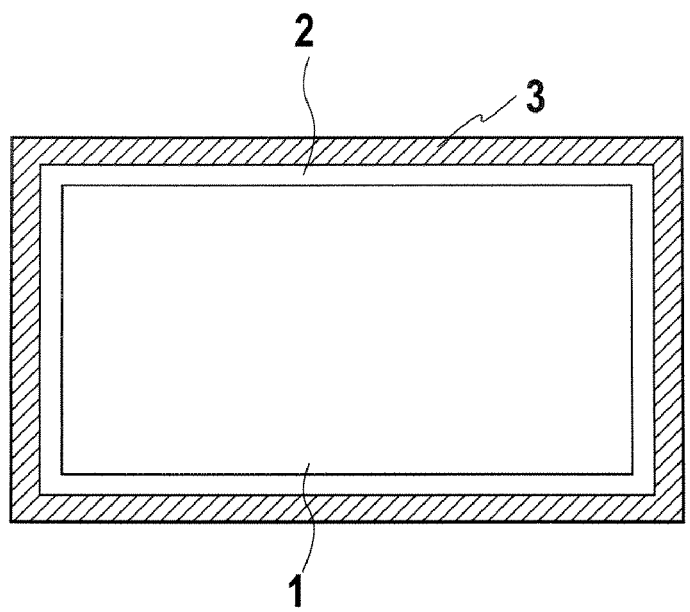
FIG. 2 is a plan view showing a schematic configuration of a periphery of an image area in a liquid crystal display device of a first embodiment.

As shown in a plan view of FIG. 2, in a liquid crystal display device of a first embodiment, a dummy area 2 that always displays white color is provided on a peripheral area between an image area 1 and a frame-like black mask 3.

On the image area 1, a plurality of translucent pixels that have reflection areas and transmission areas are arrayed. In the transmission areas, an image is displayed by a light transmission mode. Meanwhile, in the reflection area, an image is displayed by a light reflection mode using the external light.

On the dummy area 2, a plurality of reflection pixels that have only reflection areas are arrayed. In the reflection areas, the white color is always displayed by a light reflection mode using the external light. Note that, in this liquid crystal display device, the white color is displayed on both of the image area 1 and the dummy area 2 when a voltage is not applied to a liquid crystal layer (normally white display).

Figure 3:
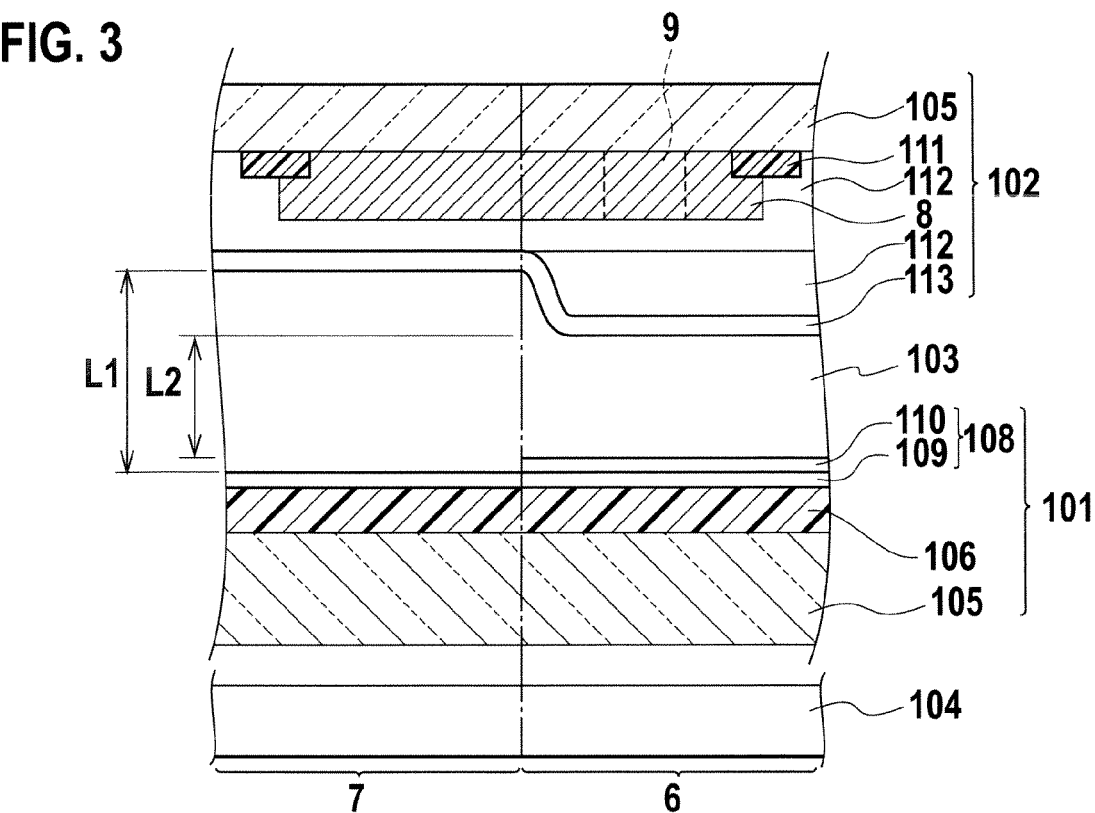
FIG. 3 is a cross-sectional view showing a schematic structure of a translucent pixel arrayed on the image area of FIG. 2.

Next, a description will be made of a configuration of the translucent pixel arrayed in the image area 1 by using a cross-sectional view of FIG. 3. As shown in FIG. 3, this liquid crystal display device includes a liquid crystal layer 103 between an array substrate 101 and an opposite substrate 102, which are arranged opposite to each other. A backlight 104 is disposed on a back surface side of the array substrate 101.

In the array substrate 101, an insulating layer 106 is formed on an upper surface of a glass substrate 105, and a transmission electrode 109 is formed on the insulating layer 106. In the case of a reflection area 6, a reflection electrode 110 is further formed on the transmission electrode 109. The transmission electrode 109 and the reflection electrode 110 form a pixel electrode 108.

In the opposite substrate 102, a color filter 8, a black matrix 111, an overcoating layer 112, and an opposite electrode 113 are formed on a lower surface of a glass substrate 105.

The translucent pixel includes the reflection area 6 having the reflection electrode 110, and the transmission area 7 having only the transmission electrode 109. In the reflection area 6, the image is displayed by using the external light reflected on the reflection electrode 110. Meanwhile, in the transmission area 7, the image is displayed by using light from the backlight 104, which has been transmitted through the transmission electrode 109. The translucent pixel has a multi-gap structure having different cell gaps between the reflection area 6 and the transmission area 7, in which a cell gap L2 of the reflection area 6 is smaller than a cell gap L1 of the transmission area 7.

Figure 4:
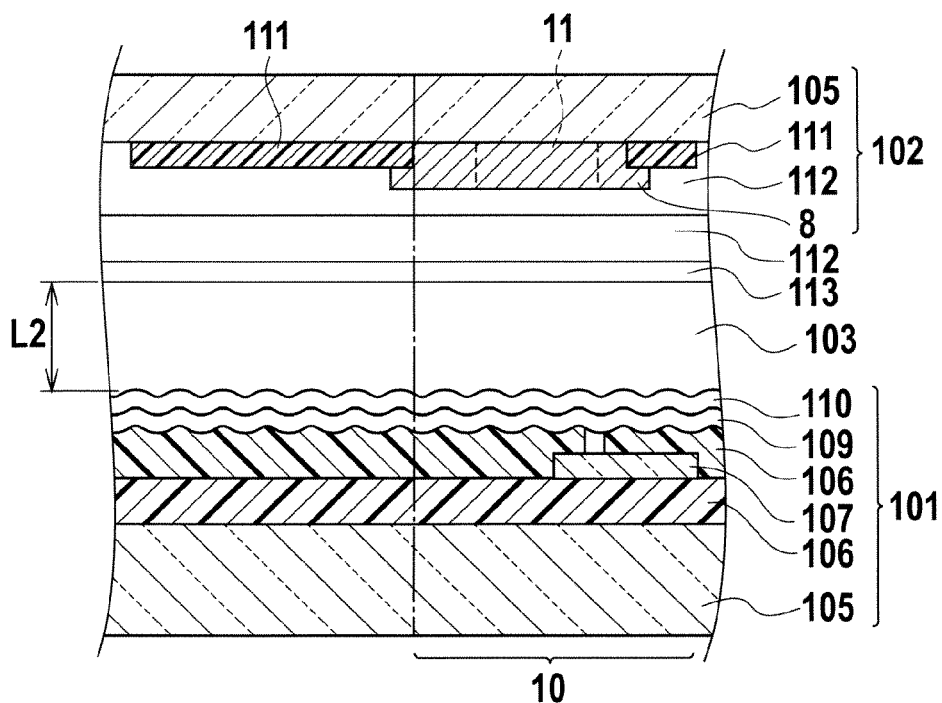
FIG. 4 is a cross-sectional view showing a schematic structure of a reflection pixel arrayed on a dummy area of FIG. 2.

Next, a description will be made of a configuration of the reflection pixel arrayed in the dummy area 2 by using a cross-sectional view of FIG. 4. As shown in FIG. 4, the reflection pixel has a single-gap structure having only a reflection area 10 in which the reflection electrode 110 is formed. White color is always displayed by reflecting the external light in the reflection area 10. Note that other basic structures of the reflection pixel are similar to those of the translucent pixel, and accordingly, the same reference numerals are assigned to the same constituents as those in FIG. 3, and a description thereof is omitted here. However, in FIG. 4, reference numeral 11 denotes a transparent area to be described later, and reference numeral 107 denotes a thin-film transistor.

Figure 5:
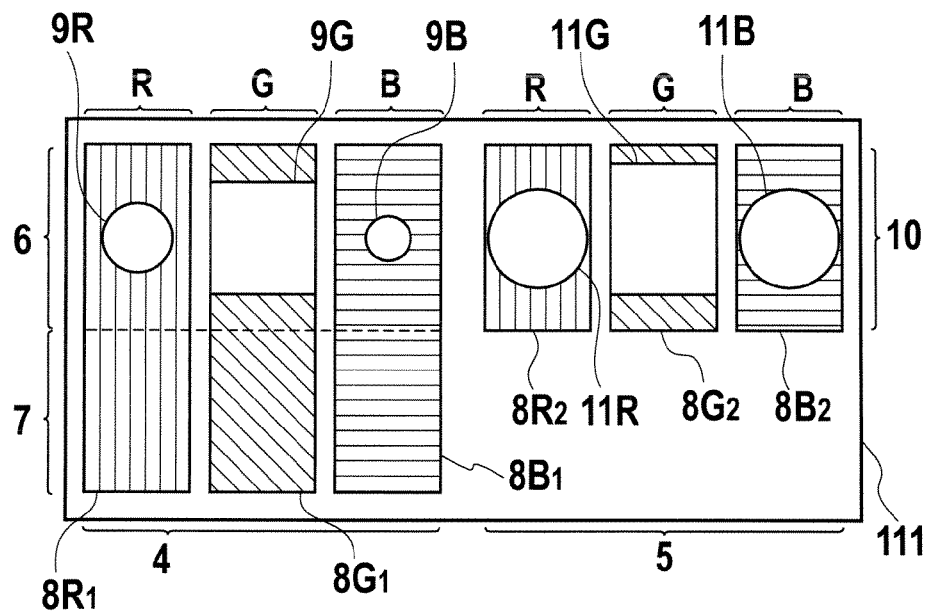
FIG. 5 is an enlarged plan view showing the respective pixels in a vicinity of a boundary between the image area and dummy area of FIG. 2.

Next, a description will be made of the configurations of the respective reflection areas in the reflection pixel and the translucent pixel by using a plan view of FIG. 5. In FIG. 5, the respective pixels in the vicinity of a boundary between the image area 1 and dummy area 2 of FIG. 2 are shown enlargedly. A translucent pixel 4 and a reflection pixel 6 are arranged in the image area and the dummy area, respectively.

The translucent pixel 4 is composed of three pixels having RGB color filters $8R_1$, $8G_1$ and $8B_1$. In the reflection area 6, transparent areas 9R, 9G and 9B are provided in the color filters $8R_1$, $8G_1$ and $8B_1$, respectively. Here, a size of the reflection area 6 is represented as S' and a size of the transparent areas 9 of the color filters is represented as $S'_{CF}$.

The reflection pixel 5 is composed of three pixels having RGB color filters $8R_2$, $8G_2$ and $8B_2$. In the reflection area 10, transparent areas 11R, 11G and 11B are provided in the color filters $8R_2$, $8G_2$ and $8B_2$, respectively. Here, a size of the reflection area 10 is represented as S, and a size of the transparent areas 11 of the color filters is represented as $S_{CF}$.

In this liquid crystal display device, in the color filters 8 of at least the same one color, a size ratio $S_{CF}/S$ obtained in such a manner that the size of the transparent area 11 of the color filter in the reflection pixel 5 is divided by the size of the reflection area 10 therein is set so as to be larger than a size ratio $S'_{CF}/S'$ obtained in such a manner that the size of the transparent area 9 of the color filter in the translucent pixel 4 is divided by the size of the reflection area 6 therein.

Specifically, first, the size S of the reflection area 10 of the reflection pixel 5 is equalized to the size S' of the reflection area 6 of the translucent pixel 4. In such a way, the above-described size ratios can be easily adjusted only by the size $S'_{CF}$ of the transparent areas 9 and the size $S_{CF}$ of the transparent areas 11 at a time of manufacturing the color filters 8.

Then, the size $S_{CF}$ of each transparent area 11 of the color filters $8R_2$, $8G_2$ and $8B_2$ in the reflection pixel 5 is made larger than the size $S'_{CF}$ of each transparent area 9 of the color filters $8R_1$, $8G_1$ and $8B_1$ in the translucent pixel 4. This relationship is represented below by expressions.

Blue color filter $S'_{CF} < S_{CF}$
Red color filter $S'_{CF} < S_{CF}$
Green color filter : $S'_{CF} < S_{CF}$ With such a configuration, brightness of the display is balanced by adjusting quantities of transmission light through the transparent areas 11 of the color filters of the reflection pixel 5 with respect to quantities of the reflection light generated unexpectedly on the transmission area 7 of the color filters of the translucent pixel 4.

Next, a description will be made of a liquid crystal display device of comparative example. In comparative example, as in FIG. 2, the dummy area 2 is provided on the peripheral area between the image area 1 and the frame-like black mask 3. On the image area 1, the translucent pixels that have the reflection areas and the transmission areas are arrayed. The image area 1 displays the color image by the light reflection mode and the light transmission mode. On the dummy area 2, the reflection pixels that have only the reflection areas are arrayed. The dummy area 2 always displays the white color by the light reflection mode.

Figure 6:
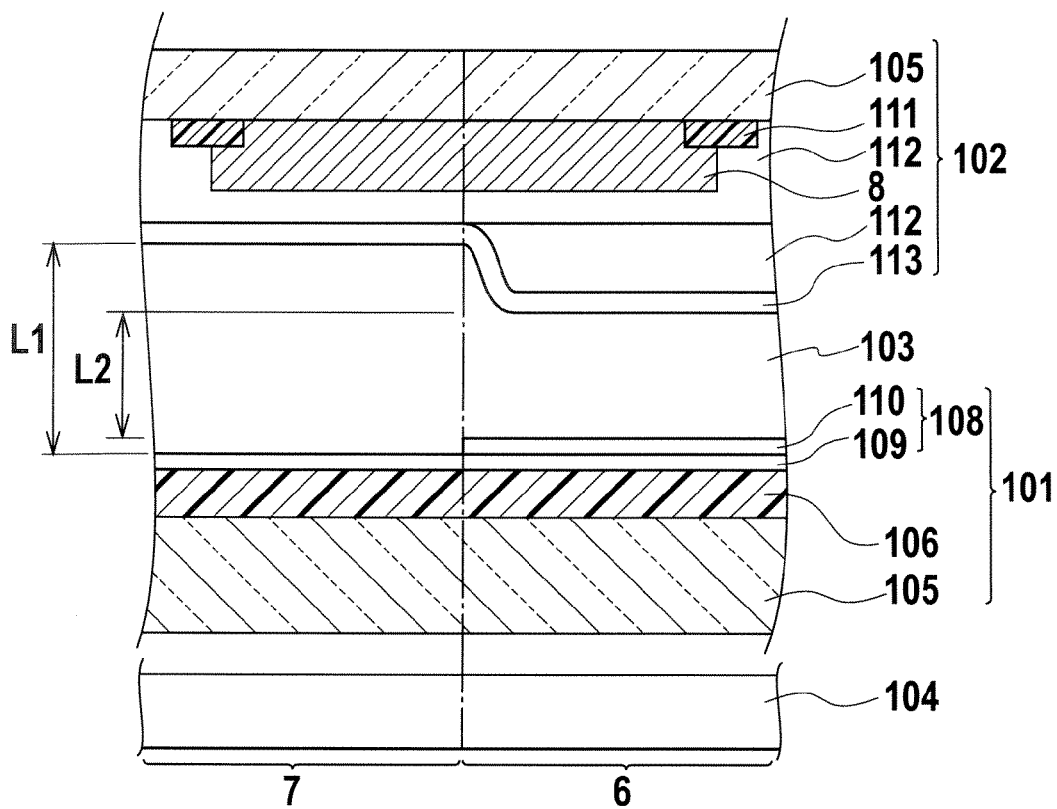
FIG. 6 is a cross-sectional view showing a schematic structure of a translucent pixel arrayed on an image area of comparative example.
Figure 7:
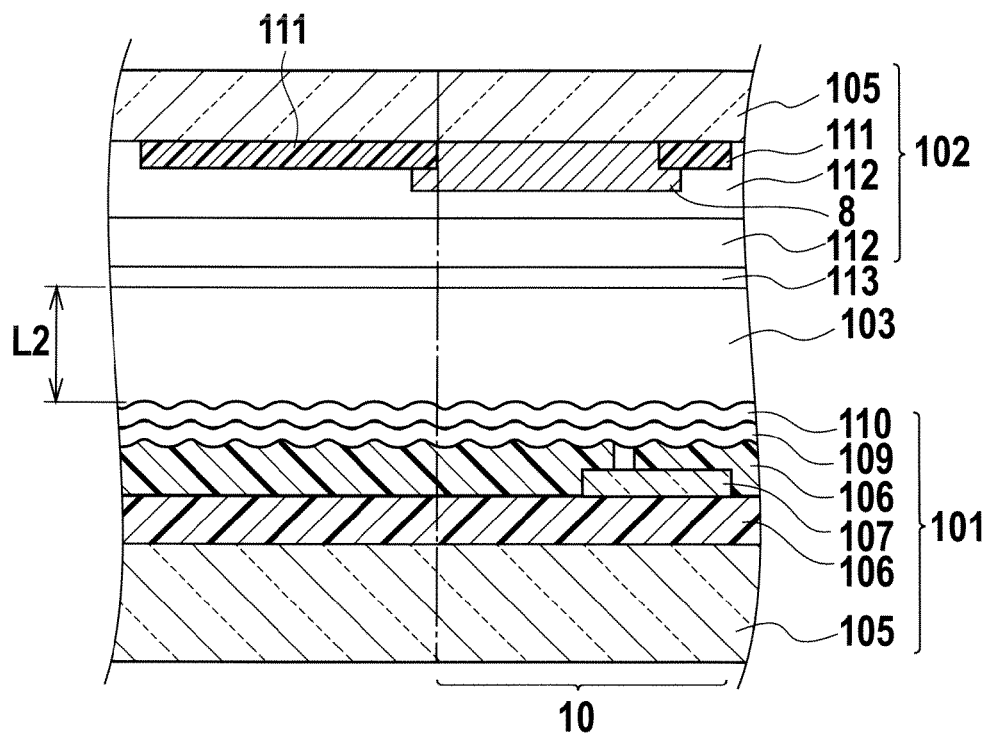
FIG. 7 is a cross-sectional view showing a schematic structure of a reflection pixel arrayed in a dummy area of comparative example.

A cross-sectional view of the translucent pixel in the image area 1 of comparative example is as shown in FIG. 6. The translucent pixel in FIG. 6 is basically similar to that in FIG. 3, and however, has a configuration without the transparent area 9 in the color filter 8. In addition, a cross-sectional view of the reflection pixel in the dummy area of comparative example is as shown in FIG. 7. The reflection pixel in FIG. 7 is basically similar to that in FIG. 4, and however, has a configuration without the transmission area 11 in the color filter 8.

In comparative example, the translucent pixel of the image area and the reflection pixel of the dummy area are different in structure from each other, and accordingly, differences in reflectance ratio and color tone occur therebetween. According to this, in the case of the reflection display of the white color, the boundary between the image area and the dummy area will become conspicuous.

As described above, according to this embodiment, in the color filters 8 of at least the same one color, the size ratio of the transparent area 11 to the reflection area 10 in the reflection pixel 5 is larger than the size ratio of the transparent area 9 to the reflection area 6 in the translucent pixel 5. In such a way, the brightness of the display is balanced by adjusting the quantity of the transmission light through the transparent area 11 of the reflection pixel 5 with respect to the quantity of the reflection light generated unexpectedly on the transmission area 7 of the translucent pixel 4. Moreover, degrees of whiteness in the translucent pixel 4 and the reflection pixel 5 are approximated to each other. Accordingly, the differences in reflectance ratio and color tone between the image area 1 and the dummy area 2 can be eliminated, thus making it possible to make the boundary therebetween inconspicuous.

Moreover, according to this embodiment, the size S of the reflection area 10 of the reflection pixel 5 is equal to the size S' of the reflection area 6 of the translucent pixel 4. In such a way, it becomes possible to easily adjust the above-described size ratio only by the size S' of each transparent area 9 of the color filters and the size $S_{CF}$ of each transparent area 11 of the color filters.

Second Embodiment

A configuration of a liquid crystal display device in a second embodiment is basically similar to that described in the first embodiment. Different points of the second embodiment from the first embodiment are the following two. The first point is that the size S of the reflection area 10 of the reflection pixel 5 is larger than the size S' of the reflection area 6 of the translucent pixel 4. The second point is that, in the blue color filters 8B, the size ratio $S_{CF}/S$ obtained in such a manner that the size of the transparent area in the reflection pixel 5 is divided by the size of the reflection area therein is larger than the size ratio $S'_{CF}/S'$ in the translucent pixel 4, and in each of the red and green color filters 8R and 8G, the size ratio $S_{CF}/S$ obtained in such a manner that the size of the transparent area in the reflection pixel 5 is divided by the size of the reflection area therein is smaller than the size ratio $S'_{CF}/S'$ in the translucent pixel 4. A description will be mainly made of portions of this embodiment, which are different from those of the first embodiment, and a description of duplicate portions will be omitted.

Figure 8:
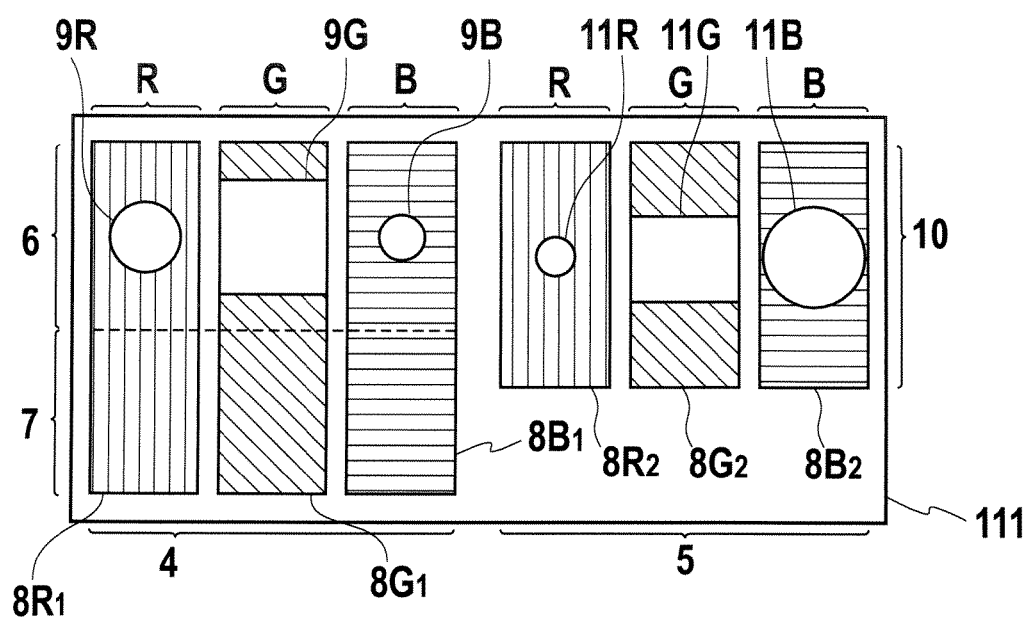
FIG. 8 is an enlarged plan view showing the respective pixels in a vicinity of a boundary between an image area and a dummy area in a liquid crystal display device of a second embodiment.

FIG. 8 is a plan view enlargedly showing a pixel in a vicinity of an image area and a dummy area in the liquid crystal display device of the second embodiment. The translucent pixel 4 and the reflection pixel 5 are arranged in the image area and the dummy area 2, respectively.

The size S of the reflection area 10 of the reflection pixel 5 is larger than the size S' of the reflection area 6 of the translucent pixel 4.

In the blue color filters $8B_1$ and $8B_2$, the size ratio $S_{CF}/S$ obtained in such a manner that the size of the transparent area 11 in the reflection pixel 5 is divided by the area of the reflection area 10 therein is larger than the size ratio $S'_{CF}/S'$ in the translucent pixel 4. Moreover, in each of the red and green color filters 8R and 8G, the size ratio $S_{CF}/S$ obtained in such a manner that the size of the transparent area 11 in the reflection pixel 5 is divided by the size of the reflection area 10 therein is smaller than the size ratio $S'_{CF}/S'$ in the translucent pixel 4. This relationship is represented below by expressions.

Blue color filter: $S'_{CF}/S' < S_{CF}/S$
Red color filter: $S'_{CF}/S' > S_{CF}/S$
Green color filter: $S'_{CF}/S' > S_{CF}/S$ With such a configuration, in the blue color filters 8B, the brightness is ensured by the transmission light through the transparent areas 11 of the reflection pixel 5. Moreover, in each of the red and green color filters, the degrees of whiteness of both of the reflection pixel 5 and the translucent pixel 4 are adjusted.

As described above, according to the second embodiment, the size S of the reflection area 10 in the reflection pixel 5 is larger than the size S' of the reflection area 6 in the translucent pixel 4. In the blue color filters 8B, the size ratio $S_{CF}/S$ of the transparent area 11 in the reflection pixel 5 with respect to the reflection area 10 therein is larger than the size ratio $S'_{CF}/S'$ in the translucent pixel 4. Hence, the brightness can be ensured by the transmission light through the transparent areas 11 of the reflection pixel 5.

Moreover, in each of the red and green color filters 8R and 8G, the size ratio $S_{CF}/S$ of the transparent area 9 in the reflection pixel 5 with respect to the reflection area 10 therein is smaller than the size ratio $S'_{CF}/S'$ in the translucent pixel 4. In such a way, the degrees of whiteness of both of the reflection pixel 5 and the translucent pixel 4 are adjusted, thus making it possible to improve the differences in reflectance ratio and color tone between the image area 1 and the dummy area 2, and to make the boundary between the image area 1 and the dummy area 2 inconspicuous in case of the reflection display of the white color.

Other Embodiments

In the color filters 8R, 8G and 8B in the first embodiment, and only in the color filters 8B in the second embodiment, the configuration is adopted, in which the size ratio $S_{CF}/S$ in the reflection pixel 5 is larger than the size ratio $S'_{CF}/S'$ in the translucent pixel 4. However, the configuration of the present invention is not limited to the above, and each size ratio in the color filters 8 of at least the same one color just needs to satisfy the above-described magnitude relationship. For example, each size ratio in the color filters of two colors may satisfy the above-described magnitude relationship, and the reflectance and the degree of whiteness may be adjusted by the reflection pixel 5 and the translucent pixel 4.

Moreover, with regard to the size S of the reflection area 10 of the reflection pixel 5 and the size S' of the reflection area 6 of the translucent pixel 4, both of the sizes are equal to each other in the first embodiment, and the size S is larger than the size S' in the second embodiment. However, the configuration of the present invention is not limited to the above. For example, the size S of the reflection area 10 of the reflection pixel 5 may be made smaller than the size S' of the reflection area 6 of the translucent pixel 4, and the above-described size ratio may be adjusted so that the differences in reflectance ratio and color tone between the image area 1 and the dummy area 2 can be improved.

Moreover, in the above-described respective embodiments, the color filters of three colors, which are red, blue, and green, are used. However, the configuration of the present invention is not limited to this. For example, not only the above-described three colors but also other colors may be combined.

What is claimed is:

1. A liquid crystal display device, comprising:
   an image area in which a plurality of transflective pixels having reflection areas and transmission areas are arrayed;
   a reflection display area in which a plurality of reflection pixels having only reflection areas are arrayed, the reflection area being disposed on a periphery of the image area; and
   color filters in which clear areas are provided for each color in the respective reflection areas of the transflective pixels and the reflection pixels, wherein,
   with regard to color filters of at least the same one color, a size ratio of the clear areas in the reflection pixels with respect to the reflection areas therein is larger than a size ratio of the clear areas in the transflective pixels with respect to the reflection areas therein,
   a size of the reflection areas of the reflection pixels is equal to a size of the reflection areas of the transflective pixels, and
   a size of the clear areas provided in the color filters of the reflection pixels is larger than a size of the clear areas provided in the color filters of the transflective pixels.

2. A liquid crystal display device, comprising:
   an image area in which a plurality of transflective pixels having reflection areas and transmission areas are arrayed;
   a reflection display area in which a plurality of reflection pixels having only reflection areas are arrayed, the reflection area being disposed on a periphery of the image area; and
   color filters in which clear areas are provided for each color in the respective reflection areas of the transflective pixels and the reflection pixels,
   wherein,
   with regard to color filters of at least the same one color, a size ratio of the clear areas in the reflection pixels with respect to the reflection areas therein is larger than a size ratio of the clear areas in the transflective pixels with respect to the reflection areas therein,
   the color filters are the three colors being red, green, and blue,
   a size of the reflection areas of the reflection pixels is larger than a size of the reflection areas of the transflective pixels,
   in the blue color filter, the size ratio of the clear areas provided in the reflection pixels with respect to the reflection areas provided therein is larger than the size ratio of the clear areas provided in the transflective pixels with respect to the reflection areas provided therein, and
   in each of the red and green color filters, the size ratio of the clear areas provided in the reflection pixels with respect to the reflection areas provided therein is smaller than the size ratio of the clear areas provided in the transflective pixels with respect to the reflection areas provided therein.

* * * * *